Oct. 28, 1958     M. J. FABBRI ET AL     2,857,749
FLEXIBLE COUPLING
Filed Aug. 14, 1956     2 Sheets-Sheet 1
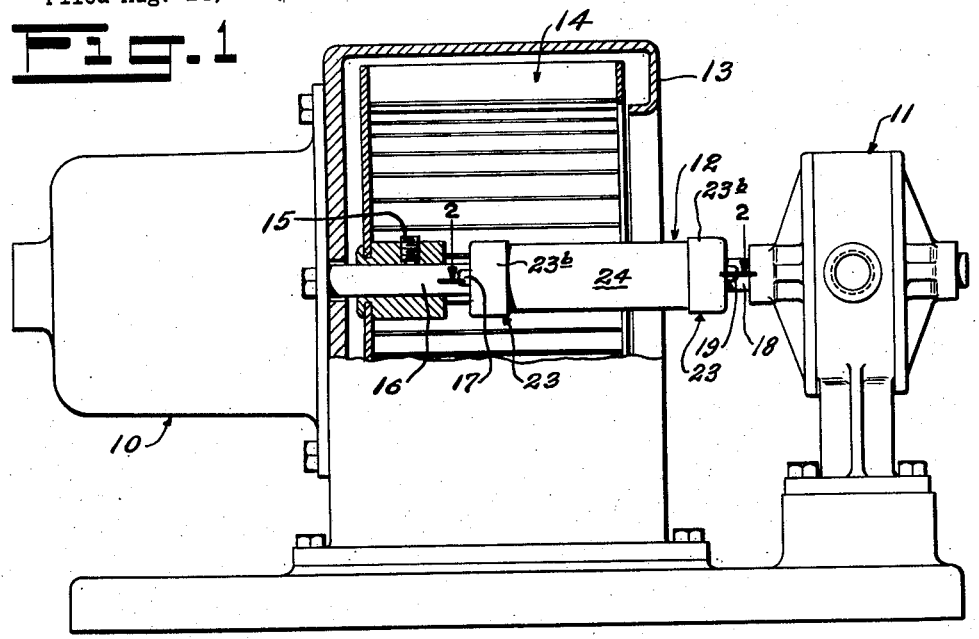
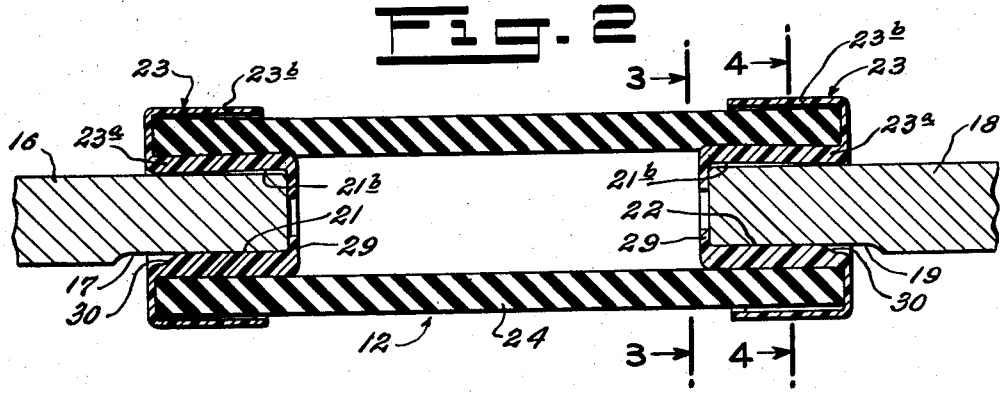
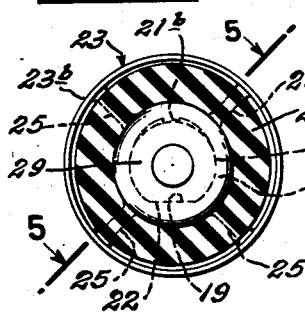
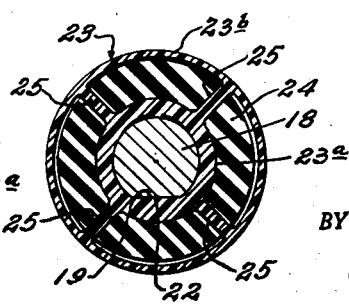
INVENTORS
MICHAEL J. FABBRI
BY DONOVAN E. ARNOLD
ATTORNEY Oct. 28, 1958  M. J. FABBRI ET AL  2,857,749
FLEXIBLE COUPLING Filed Aug. 14, 1956  2 Sheets-Sheet 2

INVENTORS
MICHAEL J. FABBRI
BY DONOVAN E. ARNOLD

ATTORNEY

United States Patent Office 2,857,749
Patented Oct. 28, 1958

2,857,749

FLEXIBLE COUPLING

Michael J. Fabbri, Litchfield, Conn., and Donovan E. Arnold, Michigan City, Ind., assignors to Nylo-Flex Products Company, La Porte, Ind., and Litchfield, Conn., a Connecticut firm Application August 14, 1956, Serial No. 603,998

3 Claims. (Cl. 64—11)

Our invention relates to a flexible coupling, and is directed particularly to a flexible coupling having a central tubular element of rubber or rubber-like material combined with a pair of relatively rigid and readily demountable end fittings, for the flexible transmission of power between a driving and a driven shaft.

One object of our invention is to provide a coupling device of the character described, wherein the interconnecting means between the flexible central tubular element and the end fittings is such as will allow the flexible tubular element to establish its own neutral axis in axial alignment between its end fittings, mounted on the respective driving and driven shafts, without stresses which might otherwise be imposed by conditions of shaft misalignment.

Another object of our invention is to provide a flexible coupling device of the character described, wherein the connecting flexible tubular element can readily be cut to any desired length, wherein the end fittings can thereafter easily be fitted to suit individual spacing conditions between the driving and driven shaft, and also wherein the end fittings of the flexible tubular element may readily be replaced to accommodate changes in diameter of the driving and driven shafts.

It is still another object of our invention to provide a flexible coupling device of the above nature wherein the assembly of the end fittings to the flexible tubular element and the installation of the assembled coupling between the driving and driven shafts can be effected without the use of set screws, and wherein, after installation, the end fittings are held captive on said flexible element.

Other objects, features and structural details of our invention will be apparent from the following description when read in conjunction with the accompanying drawings forming part of this specification, wherein:

Fig. 1 is a side elevational view, partly in section, of one installation of an improved coupling device, according to the invention, between the driving motor shaft and the driven shaft of a fuel pump in an oil burner system;

Fig. 2 is a horizontal cross-sectional view, taken along the line 2—2 of Fig. 1, showing the improved coupling device on an enlarged scale;

Fig. 3 is a vertical cross-sectional view, taken along the line 3—3 of Fig. 2, in the direction of the arrows;

Fig. 4 is a vertical cross-sectional view, taken along the line 4—4 of Fig. 2, in the direction of the arrows;

Figure 5:
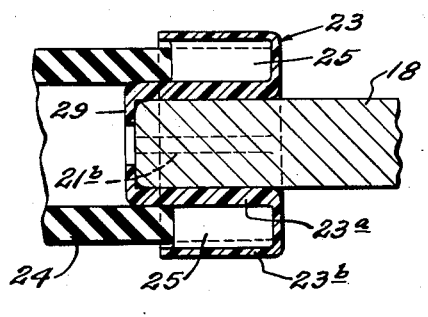
Fig. 5 is a sectional view taken along the line 5—5 of Fig. 3, in the direction of the arrows.

Referring now to the drawings, wherein like reference numerals denote corresponding parts throughout the several views, Fig. 1 illustrates the improved coupling device 12 according to the invention shown installed, by way of example, between a driving unit 10 comprising the electric motor of a gun-type oil burner, and a driven unit 11 consisting of an independently mounted fuel pump. A blower 14 in the oil burner housing 13 is mounted by means of a central hub secured on the motor shaft by a set screw 15.

For power transmission, the respective shafts 16 and 18 of the driving and driven units 10 and 11, respectively, are provided with respective flats 17 and 19, for interconnection with the flexible coupling device 12 comprising the invention. As hereinbelow described, the rotative linkage with the respective shafts 16 and 18 by their flats 17 and 19, may be accomplished either with a set screw or by means of mating with a D-bore in mounting the coupling on one or both of said said shafts.

Figure 7:
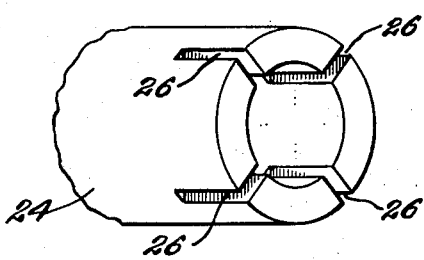
Fig. 7 is an oblique view of one end of the flexible tubular element comprising the improved coupling device.

The improved coupling device 12, according to our invention comprises a tubular element 24, preferably of rubber, or reinforced rubber, and having a smooth internal bore. Fitted over each end of the flexible tubular element 24 is a cylindrical end fitting 23, said end fittings comprising central circular hub portions 23a adapted to fit snugly within the central bore of said flexible member 24, and annular skirt portions 23b surrounding, in spaced relation, the respective outer end surfaces of said flexible member 24. The fittings 23 are provided with a plurality of spaced radial driving fins 25 interconnecting and preferably integrally formed with the hub and skirt portions 23a and 23b, respectively, of the fittings 23. Each end of the flexible element 24 is provided with an equal number of over-riding slots 26 (Fig. 7) for receiving the driving fins 25 when the fittings are in place. The hub portions 23a extend deeper into the ends of the tubular flexible element 24, than the extent of the over-riding slots 26, whereby said flexible member 24 is held axially aligned with respect to the end fittings 23 and the shafts 16 and 18 with which they connect.

The spacing between the skirt portions 23b and the outer cylindrical end portions of the flexible tubular element 24 insures that the alignment between said flexible element 24 and the end fittings 23 will be free of restriction or stress. The spacing or clearance also permits selfalignment between the end fittings 23 and the flexible element 24.

The hub portions 23a are each provided with an end closure web 29 which serves to restrict lateral motion of said end fittings on their respective shafts 16 and 18, thereby making said end fittings captive on their respective shafts, when the flexible coupling device 12 is in use.

In order to permit easy blind assembly of the end fittings 23 to their mating shafts 16 and 18 during the installation of the improved flexible coupling, the outer ends of the flats 17, 19, in the D-bores of said couplings are recessed beyond the bore entrance for the root of an approach angle of 30° to the flats 21—22 as indicated at 30 in Fig. 2. The interior of the hub 23a preferably is formed with a shallow tapered axially-extending rib 21b formed opposite the flats 21—22 in the end fittings 23 and increasing in depth from the outer to the inner ends of said hub. The provision of such ribs insures a tight fitting between the end fittings 23 and the respective shafts which they connect after installation.

Modified form

Figure 8:
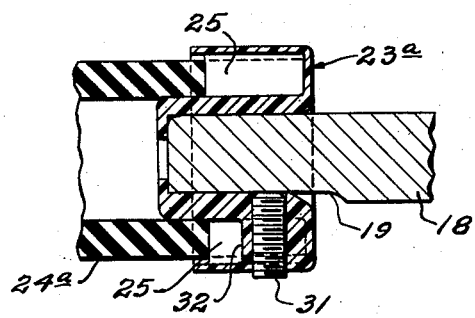
Fig. 8 is a modified sectional view, similar to Fig. 5, and illustrating the use of a set screw in an end fitting for securely holding it in place on its shaft.
Figure 6:
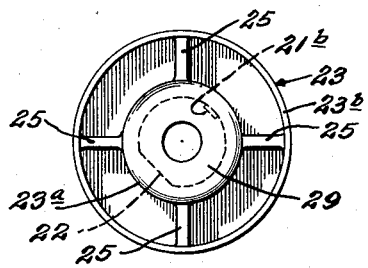
Fig. 6 is an inside end view of one of the end fittings comprising the improved coupling device.
Figure 9:
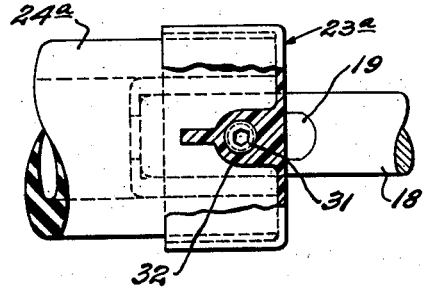
Fig. 9 is a bottom view of the coupling illustrated in Fig. 8, with a portion of the end fitting shown broken away to illustrate details of the set screw mechanism.
Figure 10:
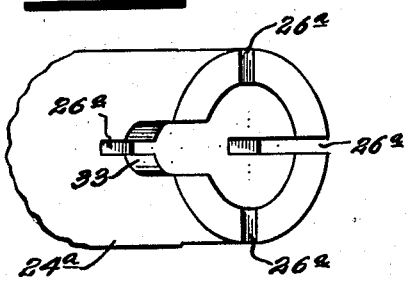
Fig. 10 is an oblique end view of the flexible element similar to Fig. 7, but modified for the provision of the set screw holding means illustrated in Figs. 8 and 9.

The modification form of the invention illustrated in Figs. 8, 9 and 10 differs from the above-described embodiment only in that provision is made for securing one or both of the end fittings 23a on the flexible tubular element 24 by means of set screws 31.

To this end, the radial driving fin 25 disposed adjacent the flat 19 is provided with a portion of increased thickness to form a boss 32, which is radially drilled and threaded to receive the set screw 31. The outer end of the complementary over-riding slot in the flexible member 24a is enlarged as indicated at 33 in Fig. 10 to accommodate the boss 32. Axial movement of the end fitting on its connecting shaft is thus further restricted.

One advantage of our improved coupling device is that the flexible tubular element 24 can readily be cut to length to suit individual machine and drive design conditions.

Another advantage of the invention is that the end fittings, not being fixedly attached to the flexible element 24, may be interchanged at any time to meet various bore requirements.

Another advantage is that, because of the extension of the hubs 29 into the ends of the flexible element 24 beyond the overriding slots 26, 26a (Figs. 7 and 10), and because the driving surfaces of the fins 25 meet with their respective radial surfaces of said overriding slots in parallel relation to the rotational axis, and closely perpendicular to the lines of torque force applied, minor misalignments are readily accommodated without sacrifice of torsional stability.

Another advantage of our invention resides in the fact that the flexible element is secured on the hub portions of the end fittings.

While we have shown and described particularly the preferred embodiments of our invention, it will occur to those skilled in the art that various changes and modifications may be made without departing from the invention. We therefore aim in the appended claims to cover all such changes and modifications as fall within the true spirit and scope of our invention.

Having thus fully described the invention, what is claimed as new and for which it is desired to secure Letters Patent is:

1. In a flexible coupling, the combination comprising a "floating" tubular element of flexible resilient material, a pair of end fittings, each integrally formed with a cylindrical tubular inner hub portion insertable in one end each of said tubular element, said inner hub portions each having a D-shaped bore adapted to receive a rotatable shaft having a flat for the transmission of torque, each end of said tubular element being provided with a plurality of radial slots of limited length extending substantially parallel with the longitudinal axis of said tubular element, and a plurality of radial fins formed about the circumference of said inner hub portions and interfitting with said radial slots for transmitting said rotational force between said end fittings and said tubular element.

2. The invention as defined in claim 1, wherein said cylindrical hub is provided with an abutment web at its inner end to limit axial motion of a shaft in said D-shaped bore.

3. The invention as defined in claim 2, wherein the axial length of the cylindrical inner hub portion of each of said end fittings is greater than the length of said radial slots.

References Cited in the file of this patent

UNITED STATES PATENTS

| | | |
|---|---|---|
| 2,170,627 | Berryman | Aug. 22, 1939 |
| 2,174,010 | Patterson | Sept. 26, 1939 |
| 2,297,619 | Haberstump | Sept. 29, 1942 |
| 2,665,841 | Smith | Jan. 12, 1954 |
| 2,667,768 | Winkler et al. | Feb. 2, 1954 |

FOREIGN PATENTS

| | | |
|---|---|---|
| 1,028,314 | France | Feb. 25, 1953 |